United States Patent
Chakraborty et al.

(10) Patent No.: US 11,481,662 B1
(45) Date of Patent: Oct. 25, 2022

(54) ANALYSIS OF INTERACTIONS WITH DATA OBJECTS STORED BY A NETWORK-BASED STORAGE SERVICE

(71) Applicant: Amazon Technologies, Inc., Seattle, WA (US)

(72) Inventors: Anand Chakraborty, Redmond, WA (US); Thayn Moore, Bothell, WA (US); Bhavesh Anil Doshi, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 1185 days.

(21) Appl. No.: 15/664,765

(22) Filed: Jul. 31, 2017

(51) Int. Cl.
*G06N 20/00* (2019.01)

(52) U.S. Cl.
CPC .................................... *G06N 20/00* (2019.01)

(58) Field of Classification Search
CPC ........................................................ G06N 20/00
See application file for complete search history.

(56) References Cited

U.S. PATENT DOCUMENTS

| | | | |
|---|---|---|---|
| 2011/0078146 A1* | 3/2011 | Prahlad | G06F 16/148 707/739 |
| 2014/0278755 A1* | 9/2014 | Eberl | G06F 16/2455 705/7.29 |
| 2016/0092499 A1* | 3/2016 | Leigh | G06F 8/34 707/740 |
| 2016/0210556 A1* | 7/2016 | Ben Simhon | G06F 11/3006 |
| 2016/0217161 A1* | 7/2016 | Haviv | G06F 3/061 |
| 2018/0053105 A1* | 2/2018 | Paul | G06N 3/0454 |
| 2018/0285777 A1* | 10/2018 | Li | G06Q 10/06 |
| 2018/0341695 A1* | 11/2018 | Goeser | G06F 16/285 |
| 2018/0365674 A1* | 12/2018 | Han | G06N 7/06 |

\* cited by examiner

*Primary Examiner* — Omar F Fernandez Rivas
*Assistant Examiner* — Selene A. Haedi
(74) *Attorney, Agent, or Firm* — Lee & Hayes, P.C.

(57) ABSTRACT

Technologies are described for analyzing interactions with data objects stored by a network-based storage service. The analysis of the interactions can identify patterns of the data object interactions and outcomes that can result from the patterns. Models can be developed that include the patterns and the outcomes corresponding to the patterns. As requests related to data object interactions are subsequently obtained by the system, the requests can be analyzed with respect to the models to identify an outcome that may be associated with the requests.

18 Claims, 9 Drawing Sheets

ANALYSIS OF INTERACTIONS WITH DATA OBJECTS STORED BY A NETWORK-BASED STORAGE SERVICE

BACKGROUND

Network-based storage services store data for customers that the customers can later access. Customers or the network-based storage services can analyze the data to identify problems that may have arisen with respect to the data of the customer. In some examples, the data stored by a network-based storage service can be analyzed to determine whether fraud has occurred with respect to an account of a customer. Often, the amounts of data analyzed to identify an issue with data of a network-based storage service customer are quite large. Consequently, the processing resources and memory resources utilized to analyze the data are also large.

The disclosure made herein is presented with respect to these and other considerations.

DETAILED DESCRIPTION

Figure 1:
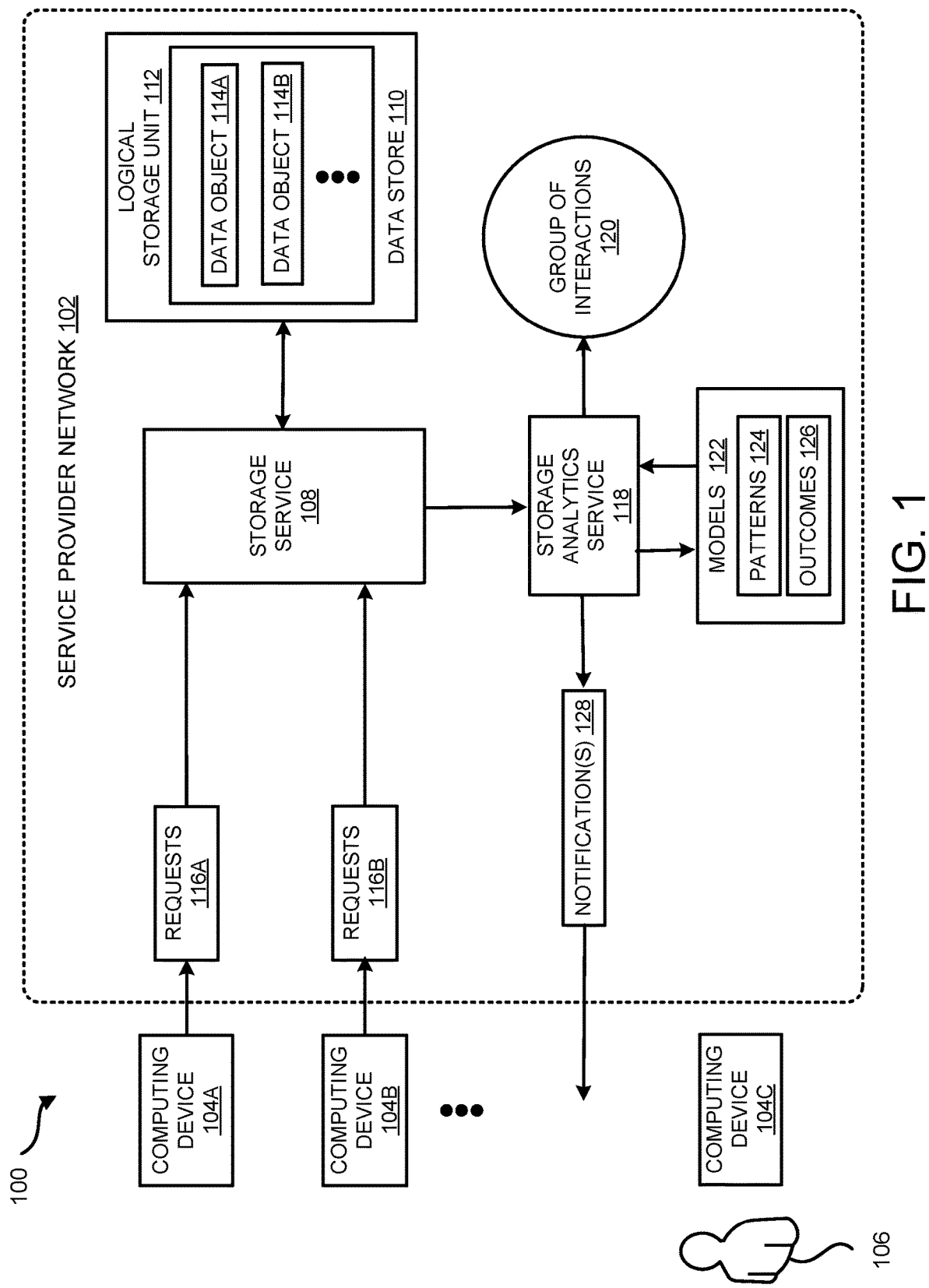
FIG. 1 is a software and network architecture diagram showing aspects of the operation of a storage analytics service to analyze interactions with data stored by a network-based storage service to determine outcomes based on the interactions, according to one particular configuration.

The following detailed description is directed to technologies for determining that an outcome can occur or be occurring based on interactions with data stored on behalf of a customer by a network-based storage service. In particular, a customer of a network-based storage service can store data in data objects maintained by the network-based storage service. The data can be accessed by requests to the network-based storage service. Requests to the network-based storage service can also correspond to at least one of the creation of data objects to store data for a customer, the deletion of data objects storing data for a customer, or modifications to data stored by the data objects. In some cases, the requests can include requests to access the data stored in the data objects, such as read requests, write requests, and/or copy requests.

Over time, the interactions with the data objects stored on behalf of a customer can be analyzed and patterns of the interactions can be detected. In some instances, the patterns of interactions with data objects can be referred to herein as a "footprint." The footprint of interactions with data objects of a customer can indicate one or more outcomes related to the customer. For example, patterns in the interactions with data objects stored on behalf of a customer can be identified, such as increases in accesses to data objects at particular times or decreases in accesses to data objects at other times. In some cases, these patterns can be identified in association with a particular outcome. To illustrate, the increase of accesses to some data objects of a customer can indicate that a deadline is approaching for a project for which the data objects store data. In another illustrative example, the accessing of data objects during certain times of day or particular times of the year can indicate that fraud may be taking place with respect to the customer. In some cases, at least one of a number of interactions with data objects of a customer can be analyzed, a type of interaction with data objects of a customer can be analyzed, or timing of interactions with data objects of a customer can be analyzed.

The patterns of interactions with data objects of a customer can be correlated with one or more outcomes. The combination of a pattern of data object interactions with at least one outcome can be considered a model. The model can be utilized to predict outcomes based on subsequent patterns of data object interactions identified by the network-based storage service. In some cases, a pattern of interactions with data objects can be correlated to a known outcome from a previous situation. For example, interactions with data objects that took place when an instance of fraud was detected by the customer can be analyzed to determine a particular pattern of interactions that may indicate a future instance of fraud.

In additional implementations, input from the customer can be utilized to determine an outcome corresponding to a pattern of interactions with data objects of the customer. To illustrate, the network-based storage service can determine that interactions with respect to data objects of a customer are outside of a typical pattern of data object interactions and query the customer as to any events that may be taking place with respect to the customer at the time that the variation was occurring. The network-based storage service can then correlate an outcome provided by the customer with the particular pattern of interactions. In various implementations, the model can be based on interactions with data objects of a number of customers of the service provider. In some cases, the number of customers can be associated with a particular category of customers or one or more other criteria provided by the network-based storage service.

In some cases, the interactions with the data objects of a customer and patterns related to those interactions can be identified using machine-learning algorithms. In various implementations, the machine-learning algorithms can include adversarial machine-learning algorithms. The adversarial machine-learning algorithms can be utilized to identify the actions of bad actors that may be trying to harm a customer by simulating the interactions that a hypothetical bad actor may take with respect to the data objects of the customer.

The outcomes identified for one or more models based on the footprint of data object interactions of a customer can result in different actions being taken by the network-based storage service. In some examples, an outcome can be identified by a model that has been trained by a large corpus of data and has successfully predicted at least a threshold number of outcomes previously. In these situations, the network-based storage service can send a notification to the customer that indicates the outcome. To illustrate, the network-based storage service can, based on a particular model, determine that a security breach has likely occurred with respect to data objects of a customer and the network-based storage service can provide a notification to the customer of the security breach.

In additional implementations, an outcome can be identified by a model that has been trained on a relatively small corpus of data and/or has been used to successfully predict less than a threshold number of previous outcomes. In these instances, the network-based storage service may perform additional operations to verify the outcome. For example, the network-based storage service may request input from the customer in an attempt to verify the predicted outcome. In another example, the network-based storage service may access the actual data stored in data objects of the customer and analyze the data itself to verify an outcome predicted by the model.

Implementations of the techniques and systems described herein can improve the functioning of the systems with respect to conventional systems. In particular, since the implementations described herein simply analyze the interactions with data objects to determine models for predicting outcomes rather than analyzing the actual data stored within the data objects, the execution of machine-learning algorithms utilizes fewer memory resources and fewer processing resources than conventional systems that rely on the data stored in the data objects. Additionally, the requests used to analyze the interactions with data objects of a customer can include sketching algorithms that enable the analysis of parts of a data stream instead of analyzing each request in the data stream to determine models and to determine possible outcomes utilizing the models. Thus, by analyzing less than the total number of requests to interact with data objects, the amount of processing resources utilized to perform the analysis decreases. Technical benefits other than those specifically mentioned herein can also be realized through an implementation of the disclosed technologies.

Furthermore, the outcomes that are included in the models can be exogenous with respect to the data utilized to determine the outcomes. That is, the outcomes of the models (e.g., fraud or business problems) are determined based on interactions with data objects, such a number of read requests or write requests, rather than the data stored by the data objects, such as data indicating sales by an online retailer or data indicating accounting information. For example, in conventional systems, the data within the data objects, such as sales data, project workflow data, content of word processing or spreadsheet documents, can be analyzed to determine financial health of an organization or whether fraud is occurring within an organization. In contrast, the implementations described herein utilize the interactions with the data objects and not the data stored by the data objects to identify outcomes related to customers. In this way, the outcomes are indirectly related to the data object interactions.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the operation of a storage analytics service to analyze interactions with data objects stored by a network-based storage service to predict outcomes based on the interactions, according to one particular configuration. The system 100 includes a service provider network 102. The service provider network 102 is a computing network configured to provide computing resources (which might be referred to simply as "resources") on a permanent or an as-needed basis. Among other types of functionality, the computing resources provided by the service provider network 102 can be utilized to implement various types of network services. The computing resources provided by the service provider network 102 can include data processing resources like data storage resources, virtual machine ("VM") instances, networking resources, data communication resources, network services, and other types of computing resources.

The service provider network 102, can be accessed using an appropriate computing system, such as the computing devices 104A, 104B, and 104C, to communicate with the service provider network 102 over an appropriate data communications network (not shown in FIG. 1). In this way, a user 106 of the service provider network 102 can configure various aspects of the operation of the computing resources provided by the service provider network 102, or to otherwise control any computing resources being utilized by a user 106.

For example, and without limitation, a computing system 104C utilized by the user 106 of the service provider network 102 can be utilized to purchase computing resources in the service provider network 102, to configure aspects of the operation of the computing resources, to access and utilize functionality provided by the various services, tools, environments, and systems described herein, and/or to perform other types of functionality with regard to the operation of the computing resources provided by the service provider network 102.

The computing devices utilized to configure and monitor the resources in the service provider network 102 (e.g. the computing devices 104A, 104B, 104C) can be any type of computing device capable of connecting to the service provider network 102 via a suitable data communications network such as, but not limited to, a laptop or desktop computer, a tablet computing device, a server computer, or a smartphone.

Administrative users employed by the owner or operator of the service provider network 102, such as administrators managing the operation of the service provider network 102, can also connect with, manage, and utilize resources provided by network services executing within the service provider network 102 in a similar fashion. Additional details regarding the configuration and operation of the service provider network 102 will be provided below with regard to FIGS. 6-9.

As discussed briefly above, the service provider network 102 can be configured to execute various types of network services. For example, and without limitation, the service provider network 102 can implement a storage service 108. The storage service 108 can be a network-based storage service that stores data obtained from customers of the service provider network 102. The data stored by the storage service 108 can be obtained from computing devices of customers of the service provider network 102, such as computing devices 104A and 104B.

The service provider network 102 can include one or more data stores, such as data store 110. Data store 110 can provide logical storage units, such as representative logical storage unit 112, that are accessible to the computing devices 104, to VM instances provided by an on-demand computing service (not shown in FIG. 1) executing in the service provider network 102, and to other computing devices. In order to provide this functionality, the data store 110 can include software and computing resources that collectively operate to store data objects, such as data object 114A and data object 114B, using block or file-level storage devices (and/or virtualizations thereof). The data objects 114A, 114B can store data obtained from customers of the service provider network 102. The data stores 110 of the service provider network 102 can be a part of a cloud-based storage system and enable remote access to data and/or other functionality by the computing devices 104.

The storage service 108 can control access to the data objects 114A, 114B. via one or more requests, such as requests 116A and 116B. The requests 116A, 116B can indicate one or more interactions corresponding to the data objects 114A, 114B of a customer of the service provider network 102. In some illustrative examples, the requests 116A, 116B can include read requests (e.g., a GET request), write requests (e.g., a PUT request), copy requests, migration requests, delete requests, requests for metadata of data objects (e.g., HEAD request), or any other type of request relating to storage, retrieval, or modification of data stored by data objects 114A, 114B. In some configurations, the requests 116A, 116B can be related to at least one of accessing data stored by the data objects 114A, 114B; creating the data objects 114A, 114B; or deleting the data objects 114A, 114B. The requests 116A, 116B when taken together can be part of a data stream that is obtained by the storage service 108. The data stream can include large numbers of requests to the storage service 108 that are obtained in a relatively short period of time. That is, the data stream can include a number of requests received sequentially at various points in time. Once data stored by the data objects 114A, 114B is accessed by computing devices of a customer, the data can be modified and a modified version of the data can be stored in the data objects 114A, 114B. In other examples, the computing devices 104A, 104B can access the data stored by the data objects 114A, 114B and download a copy of the data to be utilized by one or more applications executing on the computing devices 104A, 104B.

In the illustrative example of FIG. 1, the logical storage units 112 provided by the storage service 108 can, for example, be accessed by the computing devices 104. In the example shown in FIG. 1, for instance, the requests 116A, 116B received from the computing devices 104A and 104B can be directed to the logical storage unit 112. The data store 110 allows objects 114 to be stored and accessed at a location identified by a prefix, which defines a location at which the data objects 114 can be stored and accessed through a network-based storage service. A prefix can identify a storage container or another type of logical storage unit 112 provided by the data store 110, and a location within a nested folder structure where data objects 114 can be stored (e.g. "container_name:/foo/bar/"). Stored data objects 114 can be accessed (e.g. read from, written to, or deleted) using the prefix and the name of the data objects 114 (e.g. "container_name:/foo/bar/object1.png"). Terms other than prefix, such as "path", might also be utilized to refer to the location at which data objects 114 can be stored by a network-based storage service.

The service provider network 102 also includes a storage analytics service 118. The storage analytics service 118 can obtain information from the storage service 108 corresponding to interactions with data objects of customers of the service provider network 102, such as data objects 114A, 11B. The information obtained by the storage analytics service 118 from the storage service 108 can indicate a type of interaction with the data objects 114A, 114B, such as a read request, a write request, a copy request, and the like. The information obtained by the storage analytics service 118 from the storage service 108 can also indicate a timing of the requests 116A, 116B. Additionally, the information obtained by the storage analytics service 118 from the storage service 108 can indicate a customer associated with a request 116. Further, the information obtained by the storage analytics service 118 from the storage service 108 can indicate a storage location of the data objects 114A, 114B. In other examples, the information obtained by the storage analytics service 118 from the storage service 108 can indicate errors in requests 116A, 116B related to accessing information stored by the data objects 114A, 114B.

In particular implementations, the storage analytics service 118 can produce a group of interactions 120. In some cases, the group of interactions 120 can be associated with a single customer of the service provider network 102. In other situations, the group of interactions 120 can be associated with multiple customers of the service provider network 102. The storage analytics service 118 can also determine the group of interactions 120 based on characteristics of the interactions included in the group of interactions 120. For example, the storage analytics service 118 can identify interactions to include in the group of interactions 120 based on one or more criteria associated with metadata of the interactions. The metadata can include a size of the objects 114, date of creation of the objects 114, date of modifications of the objects 114, storage class of the objects 114 (e.g., storage for infrequently accessed data objects, storage for frequently accessed data objects, high reliability storage of data objects, etc.), identifiers of the objects 114, or combinations thereof. The storage analytics service 118 can also identify interactions to include in the group of interactions 120 based on characteristics of the customers for which the interactions are being performed. The storage analytics service 118 can also determine interactions to include in the group of interactions 120 based on a timing of the interactions. Further, the storage analytics service 118 can determine interactions to include in the group of interactions 120 based on functionality of the data objects 114 associated with the interactions, such as versioning functionality or encryption functionality.

The storage analytics service 118 can analyze the information obtained from the storage service 108 to generate one or more models 122. The models 122 can include patterns 124 and outcomes 126. Each model 122 can include one or more patterns 124 that are each correlated with at least one outcome 126. The models 122 can be generated using one or more machine-learning algorithms that analyze the information obtained from the storage service 108 related to interactions with the data objects 114 to determine the patterns 122. The one or more machine-learning algorithms can also determine correlations between the patterns 124 and the outcomes 126. In some cases, the storage analytics service 118 can determine one or more of the patterns 124 and/or one or more of the outcomes 126 by analyzing the interactions included in the group of interactions 120. The patterns 124 can indicate patterns of interactions with respect to data objects 114 of the data store 110.

The outcomes 126 can indicate certain results that are associated with one or more of the patterns 124. For example, the outcomes 126 can indicate that financial fraud may be occurring with respect to a customer of the service provider network 102. In another example, the outcomes 126 can indicate a plan for storage of data objects 114 for a customer of the service provider network 102, such as storing the data objects 114 according to different classes of storage. In an additional example, the outcomes 126 can indicate a security breach of data objects of a customer of the service provider network 102. In still another example, the outcomes 126 can indicate computing resource usage and/or memory resource usage of a customer of the service provider network 102.

In various implementations, the outcomes 126 can be exogenous with respect to an analysis of the data objects 114 utilized to produce the outcomes 126. In particular, the outcomes 126 may not be directly related to the data utilized to produce the outcomes 126. For example, the outcomes 126 can be determined based on interactions with the data objects 114, such as read requests, write requests, delete requests, and so forth instead of being determined based on the data stored by the data objects 114, such as sales data, accounting information, transactional data, or other information that can be analyzed to determine outcomes for a model. In some cases, one or more of the outcomes 126 may be more apparent to customers of the service provider network 102 having a higher level of skill or knowledge in a particular field than customers having a lesser level of skill or knowledge in the field. That is, the outcomes 126 can have a degree of indirectness with respect to the information utilized to determine the outcomes 126 in relation to a level of skill of a customer of the service provider network 102 for which the outcomes 126 are being determined. In a particular illustrative example, an outcome 126 can be considered to be exogenous with respect to the information analyzed to determine the outcome 126 based at least partly on a probability that the information would produce the outcome 126 according to previous information utilized to produce the outcome 126, an amount of knowledge of a customer of the service provider network 102, or both.

The storage analytics service 118 can utilize the models 122 to identify one or more of the outcomes 124 based on information obtained from the storage service 108 associated with interactions with the data objects 114. In some implementations, the storage analytics service 118 can perform a comparison between information related to the group of interactions 120 with the patterns 124. Based on the comparison, the storage analytics service 118 can determine that the group of interactions 120 corresponds with at least one of the outcomes 126. In some cases, the patterns 124 can include threshold criteria or a tolerance for aspects of the patterns 124 and information related to the group of interactions 120 can correspond to a pattern 124 in response to satisfying the threshold criteria or falling within the tolerance for aspects of the patterns 124. In particular implementations, the storage analytics service 118 can provide a prediction that the group of interactions 120 corresponds to one or more outcomes 126 based on an amount of correspondence between the information of the group of interactions 120 and one or more of the patterns 124. In illustrative implementations, the storage analytics service 118 can determine a probability or a range of probabilities that the group of interactions 120 are related to one or more of the outcomes 126 based on an amount of correspondence between information of the group of interactions 120 and the one or more patterns 124.

The storage analytics service 118 can generate one or more notifications 128. The notifications 128 can indicate an outcome 126 related to the group of interactions 120. In some cases, the notifications 128 can be provided to one or more customers of the service provider network 102 that are associated with the group of interactions 120. In other situations, the notifications 128 can be provided to an administrator of the service provider network 102 or to another service implemented by the service provider network 102. In additional implementations, the notifications 128 can indicate a request to provide verification or accuracy of an outcome 126 predicted by a model 122 for the group of interactions 120. In these situations, the model 122 utilized to determine the outcome 126 may have a lower success rate in predicting outcomes 126 or may have been trained with a training corpus that is less than a particular size.

Additional details regarding the mechanism described above with regard to FIG. 1 for the generation of models and the determination of outcomes based on the models for interactions with data objects will be provided below with regard to FIGS. 2-9.

Figure 2:
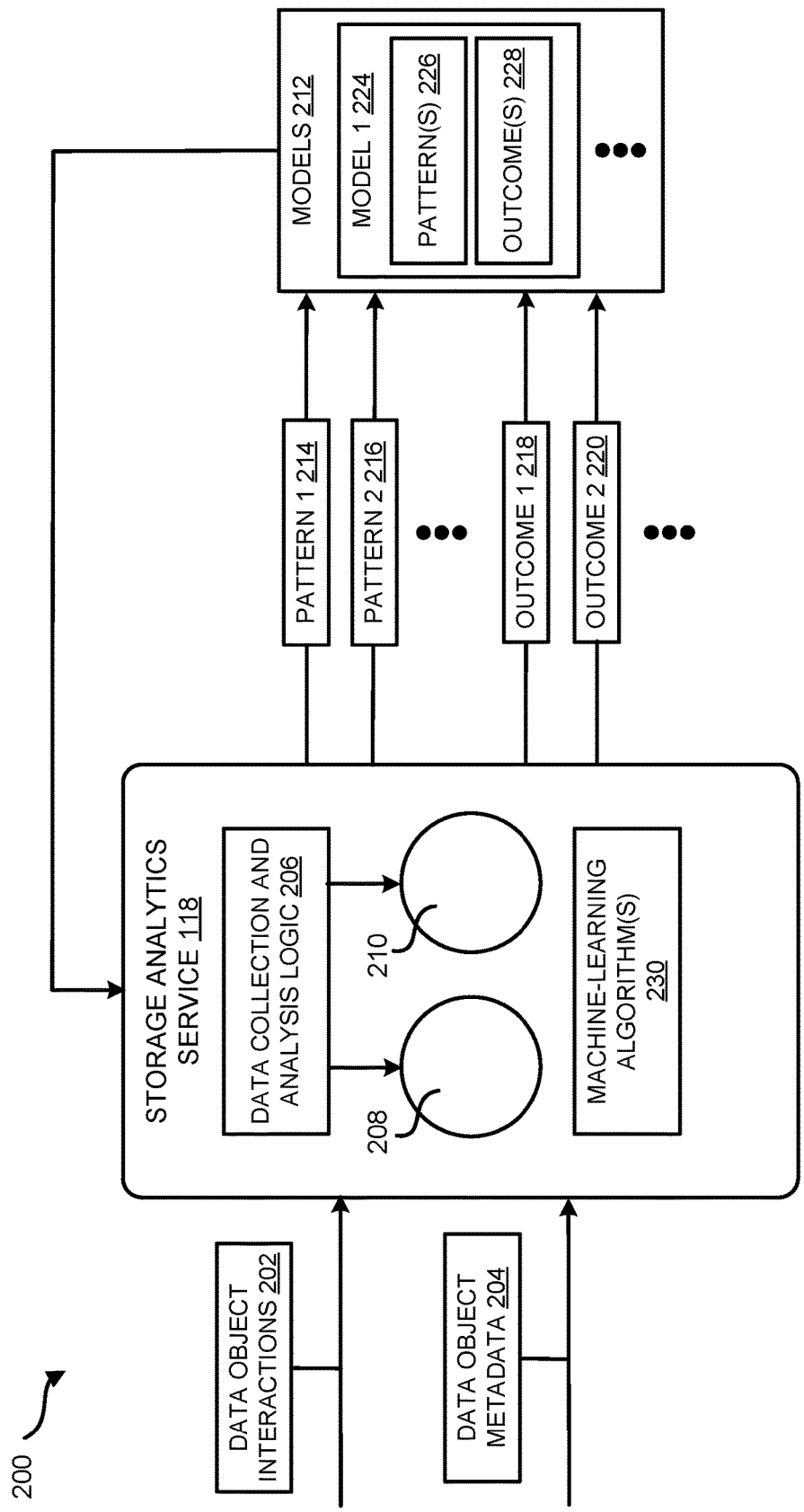
FIG. 2 is an additional architecture including a storage analytics service that can generate models to predict outcomes based on interactions with data stored on behalf of customers by a network-based storage service, according to one particular configuration.

FIG. 2 is an additional architecture 200 including a storage analytics service 118 that can generate models to predict outcomes based on interactions with data stored on behalf of customers by a network-based storage service, according to one particular configuration. In the illustrative implementation of FIG. 2, the storage analytics service 118 can obtain data object interactions 202. The data object interactions 202 can be obtained from a storage service, such as the storage service 108 of FIG. 1, that controls interactions with data objects stored by a data store, such as the data store 110, of FIG. 1. The data object interactions 202 can be derived from requests obtained by the storage service. Additionally, the data object interactions 202 can correspond to at least one of the creation, deletion, or access of data stored by data objects.

The storage analytics service 118 can also obtain data object metadata 204. The data object metadata 204 can also be obtained from a storage service, such as the storage service 108 of FIG. 1. The data object metadata 204 can indicate information about the data objects that are associated with the data object interactions 202. The data object metadata 204 can indicate a time and date that data objects were created, modified, or deleted; a size of the data objects; a modification history for the data objects; tags associated with the data objects; permissions associated with the data objects; identifiers of the data objects; storage class of the data objects, and other information related to data objects, such as whether versioning functionality is enabled for data objects or whether encryption functionality is enabled for the data objects. The data object metadata 204 can also include errors associated with requests to access data objects.

The storage analytics service 118 can include data collection and analysis logic 206. The data collection and analysis logic 206 can be implemented in hardware, software, or a combination thereof. The data collection and analysis logic 206 can obtain the data object interactions 202 and the data object metadata 204 from a storage service. In some cases, the data collection and analysis logic 206 can request the data object interactions 202 and/or the data object metadata 204 from a storage service. In additional configurations, the data collection and analysis logic 206 can passively receive the data object interactions 202 and/or the data object metadata 204 from a storage service.

Further, the data collection and analysis logic 206 can analyze the data object interactions 202 and the data object metadata 204. In particular, the data collection and analysis logic 206 can group the data object interactions 202 according to one or more criteria. In the illustrative example of FIG. 2, the data collection and analysis logic 206 has produced a first group 208 and a second group 210.

In some cases, the subset of data object interactions 202 associated with a particular customer of a service provider network, such as the service provider network 102 of FIG. 1, can be grouped. In these situations, the data collection and analysis logic 206 can group the subset of the data object interactions 202 associated with a particular customer of the service provider network and then analyze the subset of the data object interactions 202 associated with that customer. In other instances, the one or more criteria used to group the data object interactions 202 can include a classification of customers of a service provider network. For example, the data collection and analysis logic 206 can identify computing devices of customers that have an online retail business and group the subsets of the data object interactions 202 that are obtained from the computing devices of the online retail business customers of the service provider network 102. In still other implementations, the data collection and analysis logic 206 can group the data object interactions 202 based on the data object metadata 204 that is associated with the data object interactions 202. To illustrate, the data collection and analysis logic 206 can group a subset of the data object interactions 202 that are created within a specified time frame or the data collection and analysis logic 206 can group a subset of the data object interactions 202 that have at least a threshold number of write requests over a specified period of time. In a particular example, the data collection and analysis logic 206 can group the data object interactions 202 according to multiple criteria. In an illustrative example, the data collection and analysis logic 206 can group the subsets of data object interactions 202 according to customers of a service provider network that have a healthcare related business, that have over 10,000 data objects stored by the service provider network, and that have over 1 million data object accesses within a specified period of time.

Additionally, the data collection and analysis logic 206 can analyze the data object interactions 202 included in the groups 208, 210. For example, the data collection and analysis logic 206 can identify patterns of data object interactions 202 for each group 208, 210. To illustrate, the data collection and analysis logic 206 can determine that a subset of the data interactions 202 associated with the group 208 can be related to customers having a particular classification and having a specified number of write operations over a period of time, a number of data object delete operations over a different period of time, and a certain number of the data objects having encryption provided by the service provider network. The patterns determined by the data collection and analysis logic 206 can represent a footprint of the interactions of data objects stored by a customer or a group of customers of a network-based storage service.

After identifying the pattern, the data collection and analysis logic 206 can determine one or more outcomes associated with the pattern. In various implementations, the one or more outcomes can be determined based on previous outcomes that correspond to the pattern. Continuing with the illustrative example from above, the data collection and analysis logic 206 can identify an outcome for a different classification of customer, but having a similar pattern of data object interactions (e.g., a specified number of write operations over a period of time, a number of data object delete operations over a different period of time, and a certain number of the data objects have encryption provided by the service provider network). The data collection and analysis logic 206 can then correlate the outcome from the other classification with the pattern determined for the data object interactions of the group 208. In an illustrative example, the data collection and analysis logic 206 can determine that an outcome corresponding to the pattern described above is a security breach.

In this way, the data collection and analysis logic 206 can generate a number of models 212 that include patterns identified by the data collection and analysis logic 206, such as a first pattern 214 and a second pattern 216. The models 212 can also include a number of outcomes determined by the data collection and analysis logic 206, such as a first outcome 218 and a second outcome 220. In the illustrative example of FIG. 2, the models 222 include a first model 224 having one or more patterns 226 and one or more outcomes 228.

The storage analytics service 118 can utilize one or more machine learning algorithms 230 to determine the patterns and the outcomes of the models 212, such as the patterns 226 and the outcomes 228. The one or more machine-learning algorithms 230 can analyze the data object interactions 202 and/or the data object metadata 204 to identify patterns produced by the data object interactions 202 and/or the data object metadata 204. In some cases, the patterns can be identified over a period of time. In particular implementations, an adversarial machine-learning algorithm can be utilized to analyze at least one of the data object interactions 202 or the data object metadata 204. In these situations, a hypothetical adversary can be used by the adversarial machine-learning algorithm to identify patterns that may be related to an adverse outcome for a customer of the service provider network. In some illustrative examples, the adversarial machine-learning algorithm can identify patterns that may indicate that fraud with respect to a customer of the service provider network has occurred or that a security breach has occurred with respect to a customer of the service provider network. Adversarial machine-learning algorithms can also be utilized to determine outcomes in situations where information is being withheld, not recorded, or otherwise manipulated to give the impression of a different outcome or a false outcome with respect to the actual outcome that is taking place.

In addition to analyzing the data object interactions 202 and/or the data object metadata 204, the machine-learning algorithms 230 can be trained using a corpus of data that includes previously determined outcomes and the patterns corresponding to those previously determined outcomes. For example, the machine-learning algorithms 230 can be trained to identify fraud related outcomes utilizing previously determined instances of fraud and the patterns of data object interactions and the metadata associated with the data object interactions that corresponded to the instances of fraud. In some cases, the training data utilized with respect to training the machine-learning algorithms can be related to certain types of entities. To illustrate, the training data for the machine-learning algorithms can include patterns of data object interactions and the metadata associated with those data object interactions that corresponded to a security breach of online retailers. In this way, the patterns corresponding to the previously determined outcomes can be utilized to produce or update the models 212. Additionally, the conditions related to the training data can indicate the criteria utilized to produce the groups 208, 210. That is, the machine-learning algorithms 230 that have been trained using a corpus of data indicating patterns of data object interactions that indicated a security breach for online retailers can be used to analyze the data object interactions 202 included in the group 208 and the corresponding data object metadata 204 associated with online retailers to determine if a security breach has occurred with respect to the particular online retailers.

Further, the machine-learning algorithms 230 can also be trained utilizing feedback obtained from the implementation of the models 212 with respect to newly received data object interactions 202 and the data object metadata 204 associated with the newly received data object interactions 202. For example, the machine-learning algorithms 230 can receive input that an outcome previously determined by the machine-learning algorithms 230 was inaccurate. In these situations, the machine-learning algorithms 230 can adjust a pattern and/or an outcome for at least one of the models 212 based on the input. In some cases, the input can be obtained from a customer of the service provider network. The input can also be obtained from a representative of the service provider network, such as an administrator of the service provider network.

Figure 3:
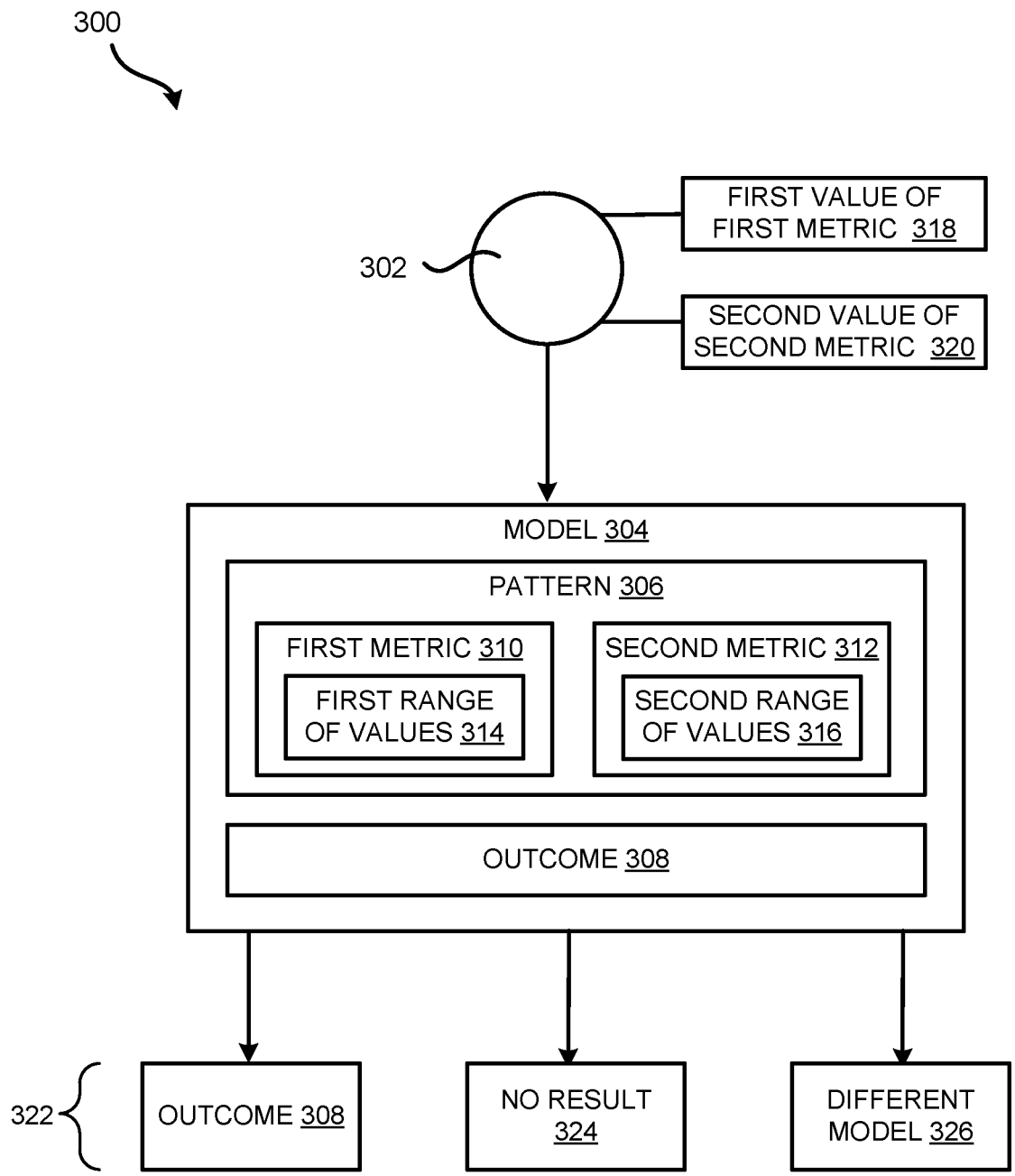
FIG. 3 shows an architecture that can provide a result of an analysis performed with respect to a model based on metrics of data object interactions and/or metrics of metadata associated with the data object interactions, according to one particular configuration.

FIG. 3 shows an architecture 300 that can provide a result of an analysis performed with respect to a model based on metrics of data object interactions and/or metrics of metadata associated with the data object interactions, according to one particular configuration. In particular, the architecture 300 includes a group of data object interactions 302. The group of data object interactions 302 can be related to customers of a service provider network that satisfy one or more criteria. The one or more criteria can indicate a size of the customers, an industry of the customers, a location of the customers, an income of the customers, goods and/or services provided by the customers, combinations thereof, and the like. In some cases, the one or more criteria utilized to assemble the group of data object interactions 302 can indicate a model utilized to analyze the group of data object interactions 302, such as a model 304. For example, in a situation where the group of data object interactions 302 are related to data objects of healthcare providers having more than 500 employees and gross income of more than $1 million, the model 304 may have been trained on previous data object interactions of healthcare providers satisfying the same or similar criteria. In some cases, the model 304 can have a tolerance or range of values of criteria for which the model 304 can be utilized to determine an outcome.

The model 304 can include a pattern 306 and an outcome 308. In the illustrative example of FIG. 3, the pattern 306 can include a first metric 310 and a second metric 312, although in other implementations, any number of metrics can be included in the pattern 306. The first metric 310 and/or the second metric 312 can correspond to metrics of interactions with data objects, such as a number of interactions with data objects of a specified size or timing of interactions with data objects of a customer of a service provider network. The first metric 310 and/or the second metric 312 can also correspond to metadata associated with interactions with data objects. In a particular example, the first metric 310 can correspond to a number of write requests for data objects of a customer and the second metric 312 can correspond to the data objects being written to having encryption functionality enabled. In another particular example, the first metric 310 can correspond to a number of delete operations of data objects of a customer and the second metric 312 can correspond to a size of the data objects that were deleted.

The values associated with the metrics 310, 312 can depend on the type of metric. In situations where the metric 310, 312 is numerical, values of the metrics 310, 312 can represent an average value or a median value of value associated with the group of data object interactions 302. In other situations, the value of a metric 310, 312 can include a total number of data object interactions of the group of data object interactions 302. In other situations, the values of a metric 310, 312 can include Boolean values, such as true or false. To illustrate, a value of the first metric 310 can be true when versioning is enable for data objects or false when versioning is not enabled for the data objects.

The pattern 304 can indicate that the first metric 310 is associated with a first range of values 314 and that the second metric 312 is associated with a second range of values 316. The inclusion of the first metric 310, the second metric 312, the first range of values 314, and the second range of values 316 in the pattern 306 can be based on an analysis of data object interactions by one or more machine-learning algorithms. In particular, the analysis of data object interactions by the one or more machine-learning algorithms can determine that when the first metric 310 has a value within the first range of values 314 and the second metric 312 has a value within the second range of values 316, the outcome 308 will likely take place. The likelihood that the outcome 308 will be produced by the pattern 306 can be at least a threshold likelihood, such as at least 90%, at least 95%, at least 99%, or at least 99.99%.

Additionally, the group of data object interactions 302 can be associated with a number of metrics that can correspond to metrics of the model 304 and can be utilized to determine a result of analyzing the group of data object interactions 302 with respect to the model 304. In the illustrative example of FIG. 3, the group of data object interactions 302 can have a first value of the first metric 318 and a second value of the second metric 320. The value 318 can be compared to the first range of values 314 and the value 320 can be compared to the second range of values 316 to determine whether the group of object interactions 302 corresponds to the pattern 306 and can result in the outcome 308. For example, if the first value of the first metric 318 is included in the first range of values 314 and the second value of the second metric 320 is included in the second range of values 316, then the outcome 308 can be associated with the group of data object interactions 302. In another example, if the first value of the first metric 318 is not included in the first range of values 314 and/or the second value of the second metric 320 is not included in the second range of values 316, then the outcome 308 may not be associated with the group of data object interactions 302.

In some situations, the first value of the first metric 318 and the second value of the second metric 320 can represent respective distributions of values for the first metric 310 and the second metric 312. In these cases, a similarity metric can be determined to indicate an amount of correspondence between the first value of the first metric 318 and the first range of values 314 and an amount of correspondence between the second value of the second metric 320 and the second range of values 316. In instances where the amount of correspondence between the first value of the first metric 318 and the first range of values 314 and the amount of correspondence between the second value of the second metric 320 and the second range of values 316 satisfy a threshold amount, then the similarity metric can also have a value that satisfies a threshold value, and the group of data object interactions 302 can be associated with the outcome 308.

After analyzing the group of data object interactions 302 with respect to the model 304, a result 322 can be produced. In situations where the first value of the first metric 318 is included in the first range of values 314 and the second value of the second metric 320 is included in the second range of values 316, the model 304 can produce the outcome 308 indicating that the group of data object interactions 302 is likely to produce the outcome 308 included in the model 304. In scenarios, where the first value of the first metric 318 is not included in the first range of values 314 and/or the second value of the second metric 320 is not included in the second range of values 316, the model 304 can produce a result 322 of no result 324. No result 324 can indicate that the likelihood that the group of data object interactions 302 will produce the outcome 308 is less than a threshold likelihood. In other cases, the first value of the first metric 318 not being included in the first range of values 314 and the second value of the second metric 320 not being included in the second range of values 316 can produce a result 322 of different model 326. In these instances, the model 304 can indicate that the group of data object interactions 302 can be evaluated using another model.

In some cases, the group of data object interactions 302 produced by a storage analytics service can be evaluated with respect to a number of different models. In particular implementations, the group of data object interactions 302 can be evaluated according to a sequence of models. Additionally, when the group of data object interactions 302 is evaluated with respect to a number of models, the group of data object interactions 302 can be associated with multiple outcomes.

Figure 4:
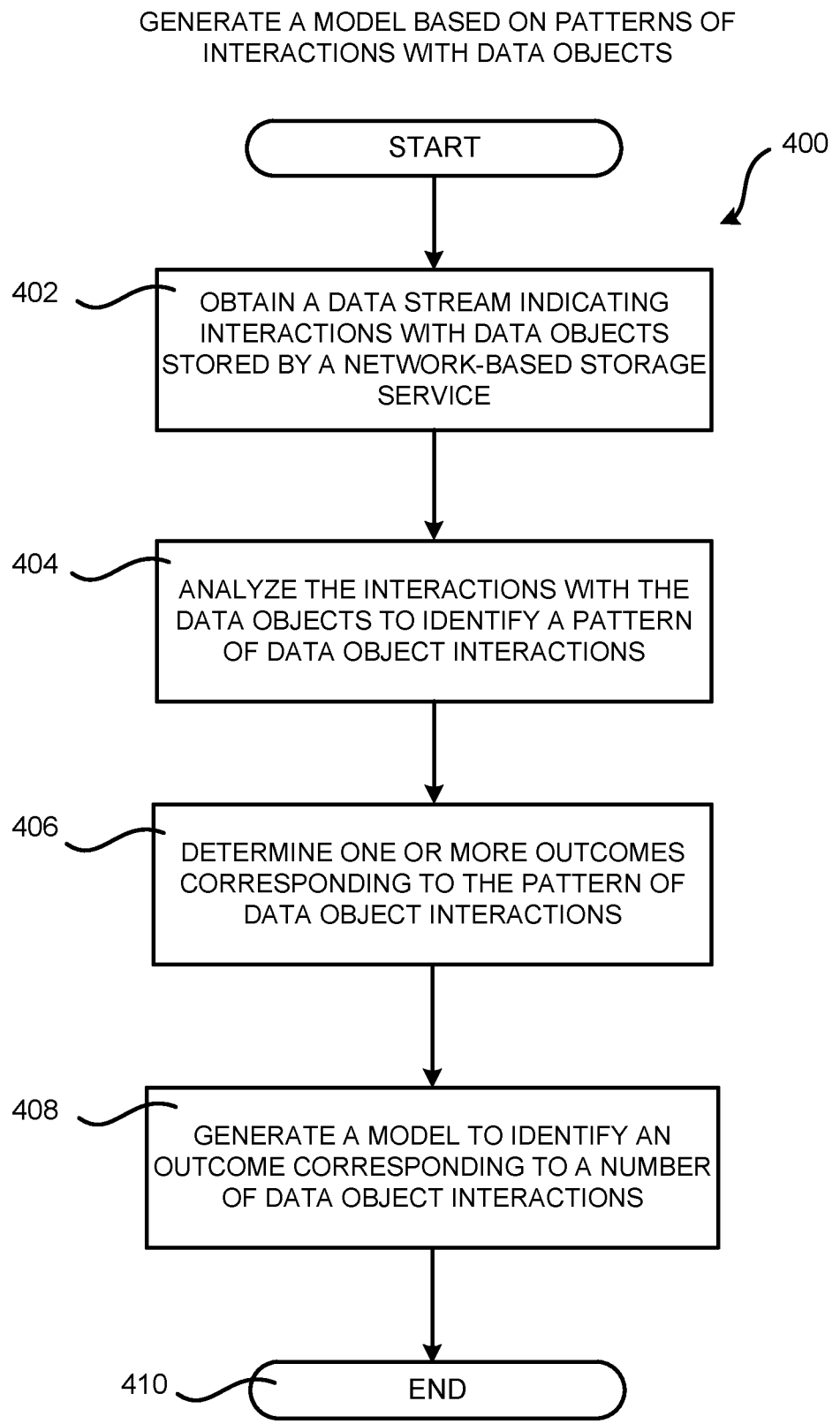
FIG. 4 is a flow diagram showing aspects of a process to generate models to predict outcomes based on interactions with data stored on behalf of customers by a network-based storage service, according to one particular configuration.
Figure 5:
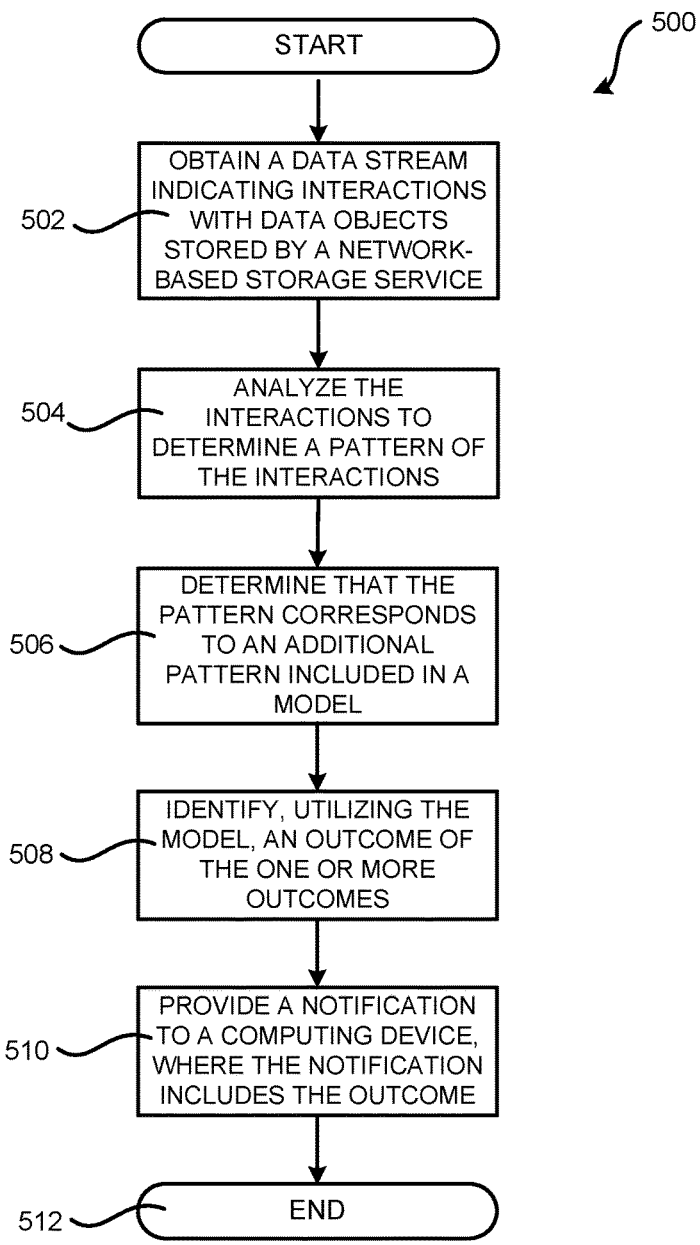
FIG. 5 is a flow diagram showing aspects of a process to determine outcomes of interactions with data stored on behalf of customers by a network-based storage service with respect to a model, according to one particular configuration.

It should be appreciated that the logical operations described herein with respect to FIGS. 4 and 5, and the other FIGS., can be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules.

These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

FIG. 4 is a flow diagram showing aspects of a process 400 to generate models to predict outcomes based on interactions with data stored on behalf of customers by a network-based storage service, according to one particular configuration. The process 400 shown in FIG. 4 begins at operation 402 with obtaining a data stream indicating interactions with data objects stored by a network-based storage service. The data objects can be associated with customers of the network-based storage service. Additionally, the interactions with the data objects can correspond to requests to access the data objects.

At 404, the process 400 includes analyzing the interactions with the data objects to identify a pattern of data object interactions. In some cases, the pattern of data object interactions can be identified by analyzing the interactions with the data objects using one or more machine learning algorithms. In an illustrative example, the one or more machine learning algorithms can include an adversarial machine learning algorithm. In addition, the pattern can indicate a first range of values for a first metric of the requests and a second range of values for a second metric of the requests. In an illustrative example, the first metric can be related to a first number of data object requests corresponding to a type of metadata of the data object requests and a first range of values for the first metric. In another illustrative example, the second metric can be related to a second number of data object requests corresponding to a type of data object request obtained over a period of time and a second range of values for the second metric.

At 406, the process 400 includes determining one or more outcomes corresponding to the pattern of data object interactions. In some cases, the one or more outcomes can be exogenous with respect to the interactions with the data objects based at least partly on a probability of the outcome being previously attributed to data object interactions. In particular implementations, an outcome of the model can be considered exogenous with respect to data object interactions when there have been few or no previous instances where the outcome has been attributed to a pattern of data object interactions. In these situations, the probability that the outcome has been previously attributed to a pattern of data object interactions can be below a threshold probability. Also, the probability that the outcome has been previously attributed to patterns indicated by the information stored by the data objects may be higher than a threshold probability.

In addition, at 408, the process 400 includes generating a model to identify an outcome corresponding to a number of data object interactions. In some cases, the model can be generated based at least in part on an analysis of metadata of the interactions with the data objects. The metadata can include at least one of a time of creation of the data objects, a size of the data objects, a modification history of the data objects, permissions related to the data objects, tags associated with the data objects, identifiers of the data objects, file type of the data objects, versioning information of the data objects, or encryption information of the data objects. The model can be utilized to analyze additional interactions with additional data objects stored by the network-based storage service. In particular, an additional pattern of the interactions of the additional data objects can be identified and used to determine an outcome associated with the model based on the additional pattern corresponding to the pattern of the model. In illustrative configurations, determining that the additional pattern corresponds to the pattern of the model includes determining a similarity metric between the first pattern and the second pattern. The similarity metric can be determined by determining a value for a metric for a set of requests related to data object interactions and comparing the value to a corresponding value of the at least one metric included in the model. The process 400 ends at 410.

FIG. 5 is a flow diagram showing aspects of a process 500 to predict outcomes of interactions with data stored on behalf of customers by a network-based storage service, according to one particular configuration. The process 500 shown in FIG. 5 begins at operation 502 with obtaining a data stream indicating interactions with data objects stored by a network-based storage service. The data objects can be associated with customers of the network-based storage service. Also, the interactions with the data objects can include requests to access the data objects.

At 504, the process 500 includes analyzing the interactions to determine a pattern of interactions. In some cases, the interactions being analyzed can be included in a particular group of interactions. The group of interactions can be based at least partly on at least one of a characteristic of customers of the network-based storage service, a type of data object request, or a type of metadata related to requests for data objects At 506, the process 500 includes determining that the pattern corresponds to an additional pattern included in a model. The model can include one or more outcomes that are associated with the pattern. Additionally, at 508, the process 500 includes identifying, utilizing the model, an outcome of the one or more outcomes of the model. In some cases, the outcome can be associated with a confidence level. The confidence level can be based at least partly on a corpus of data utilized to train the model that produces the outcome. Additionally, the confidence level can be based at least partly on at least one of a number of previous outcomes used to determine the model, a machine-learning algorithm utilized to generate the model, or a similarity metric between the pattern generated from the data object interactions of the data stream and the pattern of the model.

In particular implementations, when the confidence level of the outcome is below a threshold, a number of actions can be performed to improve the accuracy of the outcome. For example, a notification can be provided to an administrator of the network-based storage service based at least partly on the confidence level being below a threshold level. The administrator can then analyze the outcome and determine if additional information is to be obtained to improve the accuracy of the outcome. In another example, a request can be provided to the customer for information regarding the accuracy of the outcome. In response to the request, the network-based storage service can obtain input from a computing device of the customer indicating an amount of accuracy of the income. In some configurations, the input obtained from the customer can be utilized to update the model to improve the accuracy of the model in determining the outcome.

Further, at 510, the process 500 includes providing a notification to a computing device where the notification includes the outcome. In some cases, the notification can be made available via a user interface provided by the network-based storage service. In other situations, the network-based storage service can provide a dashboard or control panel accessible to the customer that indicates the outcome. In certain situations, the notification can be provided to a computing device of a customer of the network-based storage service based at least partly on a confidence level of the outcome being above a threshold level. The process then ends at 512.

Figure 6:
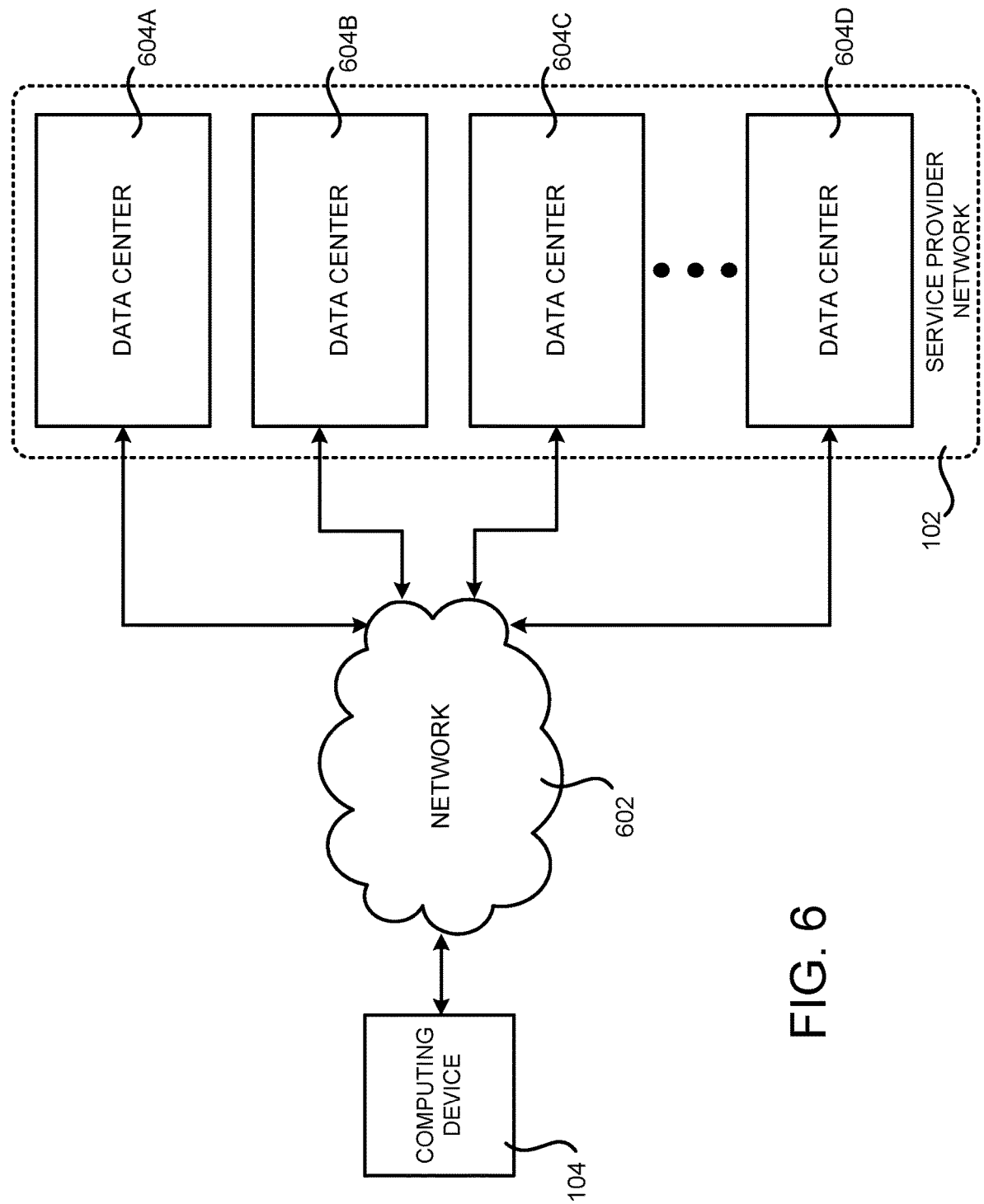
FIG. 6 is a system and network diagram that shows an illustrative operating environment that includes a service provider network that can be configured to implement aspects of the functionality described herein.

FIG. 6 is a system and network diagram that shows one illustrative operating environment for the configurations disclosed herein that includes a service provider network 102 that can be configured to execute the storage service 108, the storage analytics service 118, and the other network services described herein, according to one particular configuration. As discussed briefly above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can be data storage resources, data processing resources, such as VM instances, networking resources, data communication resources, network services, and other types of resources.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 are enabled in one implementation by one or more data centers 604A-604D (which might be referred to herein singularly as "a data center 604" or collectively as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative configuration for a data center 604 that can be utilized to implement the technologies disclosed herein will be described below with regard to FIG. 7.

The users of the service provider network 102 can access the computing resources provided by the service provider network 102 over a network 602, which can be a wide area communication network ("WAN"), such as the Internet, an intranet or an Internet service provider ("ISP") network or a combination of such networks. For example, and without limitation, a computing device 104 operated by a user of the service provider network 102 can be utilized to access the service provider network 102 by way of the network 602. It should be appreciated that a local-area network ("LAN"), the Internet, or any other networking topology known in the art that connects the data centers 604 to remote customers and other users can be utilized. It should also be appreciated that combinations of such networks can also be utilized.

Figure 7:
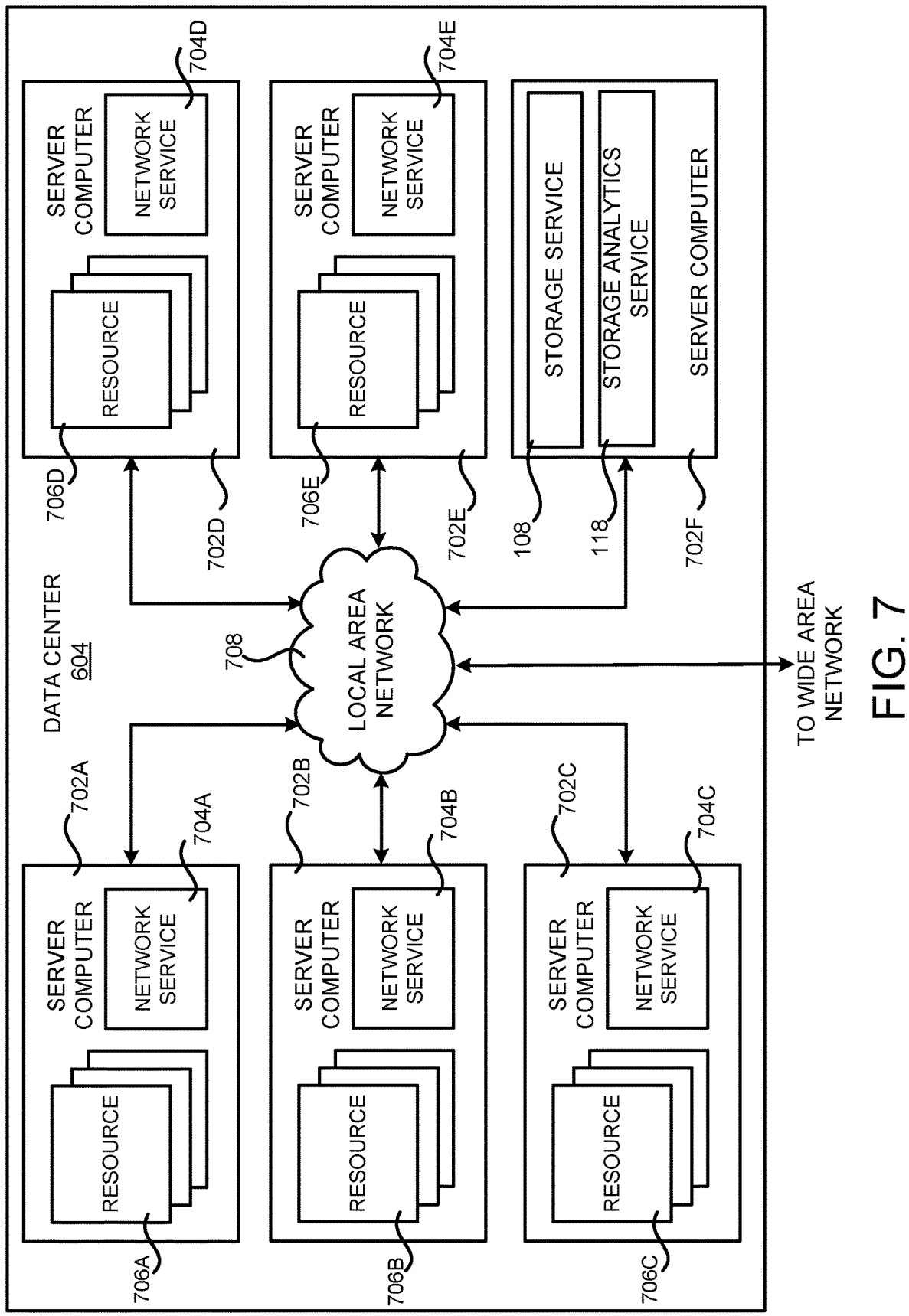
FIG. 7 is a computing system diagram illustrating a configuration for a data center that can be utilized to implement aspects of the technologies disclosed herein.

FIG. 7 is a computing system diagram that illustrates one configuration for a data center 604 that can be utilized to implement the storage service 108, the storage analytics service 118, and the other network services disclosed herein. The example data center 604 shown in FIG. 7 includes several server computers 702A-702E (which might be referred to herein singularly as "a server computer 702" or in the plural as "the server computers 702") for providing the computing resources 706A-706E, respectively.

The server computers 702 can be standard tower, rackmount, or blade server computers configured appropriately for providing the various computing resources described herein (illustrated in FIG. 7 as the computing resources 706A-706E). As mentioned above, the computing resources 706 provided by the service provider network 102 can be data storage resources, data processing resources such as VM instances or hardware computing systems, database resources, networking resources, and others. Some of the servers 702 can also be configured to execute network services 704A-704E capable of instantiating, providing and/or managing the computing resources 706, some of which are described in detail herein.

The data center 604 shown in FIG. 7 also includes a server computer 702F that can execute some or all of the software components described above. For example, and without limitation, the server computer 702F can be configured to execute the storage service 108 and the storage analytics service 118, both of which were described in detail above. The server computer 702F can also be configured to execute other components and/or to store data for providing some or all of the functionality described herein. In this regard, it should be appreciated that components or different instances of the storage service 108 and the storage analytics service 118 can execute on many other physical or virtual servers in the data centers 604 in various configurations.

In the example data center 604 shown in FIG. 7, an appropriate LAN 708 is also utilized to interconnect the server computers 702A-702F. The LAN 708 is also connected to the network 602 illustrated in FIG. 6. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 604A-604D, between each of the server computers 702A-702F in each data center 604, and, potentially, between computing resources 706 in each of the data centers 604. It should be appreciated that the configuration of the data center 604 described with reference to FIG. 7 is merely illustrative and that other implementations can be utilized.

Figure 8:
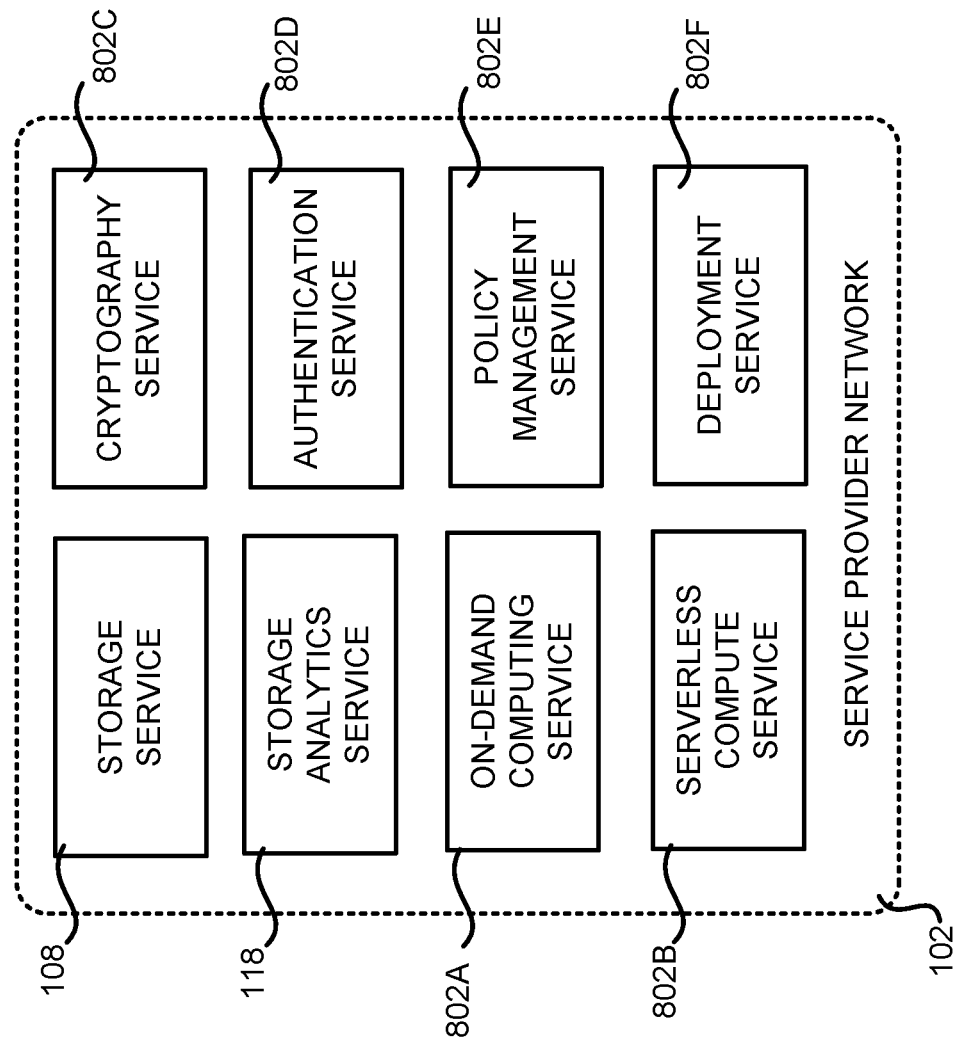
FIG. 8 is a network services diagram that shows aspects of several services that can be provided by and utilized within a service provider network configured to implement the various technologies disclosed herein.

FIG. 8 is a system and network diagram that shows aspects of several network services that can be provided by and utilized within a service provider network 102 in one configuration disclosed herein. In particular, and as discussed above, the service provider network 102 can provide a variety of network services to customers and other users of the service provider network 102 including, but not limited to, the storage service 108, the storage analytics service 118, an on-demand computing service 802A, a serverless compute service 802B, a cryptography service 802C, an authentication service 802D, a policy management service 802E, and a deployment service 802F. The service provider network 102 can also provide other types of network services, some of which are described below.

It is to be appreciated that users of the service provider network 102 can include organizations or individuals that utilize some or all of the network services provided by the service provider network 102. As described above, users such as the user 120 can communicate with the service provider network 102 using an appropriate computing device 104 through a network, such as the network 602 shown in FIG. 6.

It is also noted that not all configurations described include the network services shown in FIG. 8 and that additional network services can be provided in addition to, or as an alternative to, the services explicitly described herein. Each of the services shown in FIG. 8 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 8 will now be provided.

The on-demand computing service 802A can be a collection of computing resources configured to instantiate VM instances and to provide other types of computing resources 706 on demand. For example, a user of the service provider network 102 can interact with the on-demand computing service 802A (via appropriately configured and authenticated API calls, for example) to provision and operate VM instances that are instantiated on physical computing devices hosted and operated by the service provider network 102. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 802A is shown in FIG. 8, any other computer system or computer system service can be utilized in the service provider network 102 to implement the functionality disclosed herein, such as a computer system or computer system service that does not employ virtualization and instead provisions computing resources on dedicated or shared computers/servers and/or other physical devices.

The serverless compute service 802B is a network service that allows users to execute code (which might be referred to herein as a "function") without provisioning or managing server computers in the service provider network 102. Rather, the serverless compute service 802B can automatically run code in response to the occurrence of events. The code that is executed can be stored by the storage service 100 or in another network accessible location.

In this regard, it is to be appreciated that the term "serverless compute service" as used herein is not intended to infer that servers are not utilized to execute the program code, but rather that the serverless compute service 802B enables code to be executed without requiring a user to provision or manage server computers. The serverless compute service 802B executes program code only when needed, and only utilizes the resources necessary to execute the code. In some configurations, the user or entity requesting execution of the code might be charged only for the amount of time required for each execution of their program code.

The service provider network 102 can also include a cryptography service 802C. The cryptography service 802C can utilize storage services of the service provider network 102, such as the storage service 100, to store encryption keys in encrypted form, whereby the keys can be usable to decrypt user keys accessible only to particular devices of the cryptography service 802C. The cryptography service 802C can also provide other types of functionality not specifically mentioned herein.

As illustrated in FIG. 8 and discussed above, the service provider network 102, in various configurations, also includes an authentication service 802D and a policy management service 802E. The authentication service 802D, in one example, is a computer system (i.e., collection of computing resources 706) configured to perform operations involved in authentication of users. For instance, one of the services shown in FIG. 8 can provide information from a user to the authentication service 802D to receive information in return that indicates whether or not the requests submitted by the user are authentic.

The policy management service 802E, in one example, is a network service configured to manage policies on behalf of users of the service provider network 102. The policy management service 802E can include an interface (e.g. API or GUI) that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The service provider network 102 can additionally maintain other network services based, at least in part, on the needs of its customers. For instance, the service provider network 102 can maintain a deployment service 802F for deploying program code in some configurations. The deployment service 802F provides functionality for deploying program code, such as to virtual or physical hosts provided by the on-demand computing service 802A. Other services include, but are not limited to, database services, object-level archival data storage services, and services that manage, monitor, interact with, or support other services. The service provider network 102 can also be configured with other network services not specifically mentioned herein in other configurations.

Figure 9:
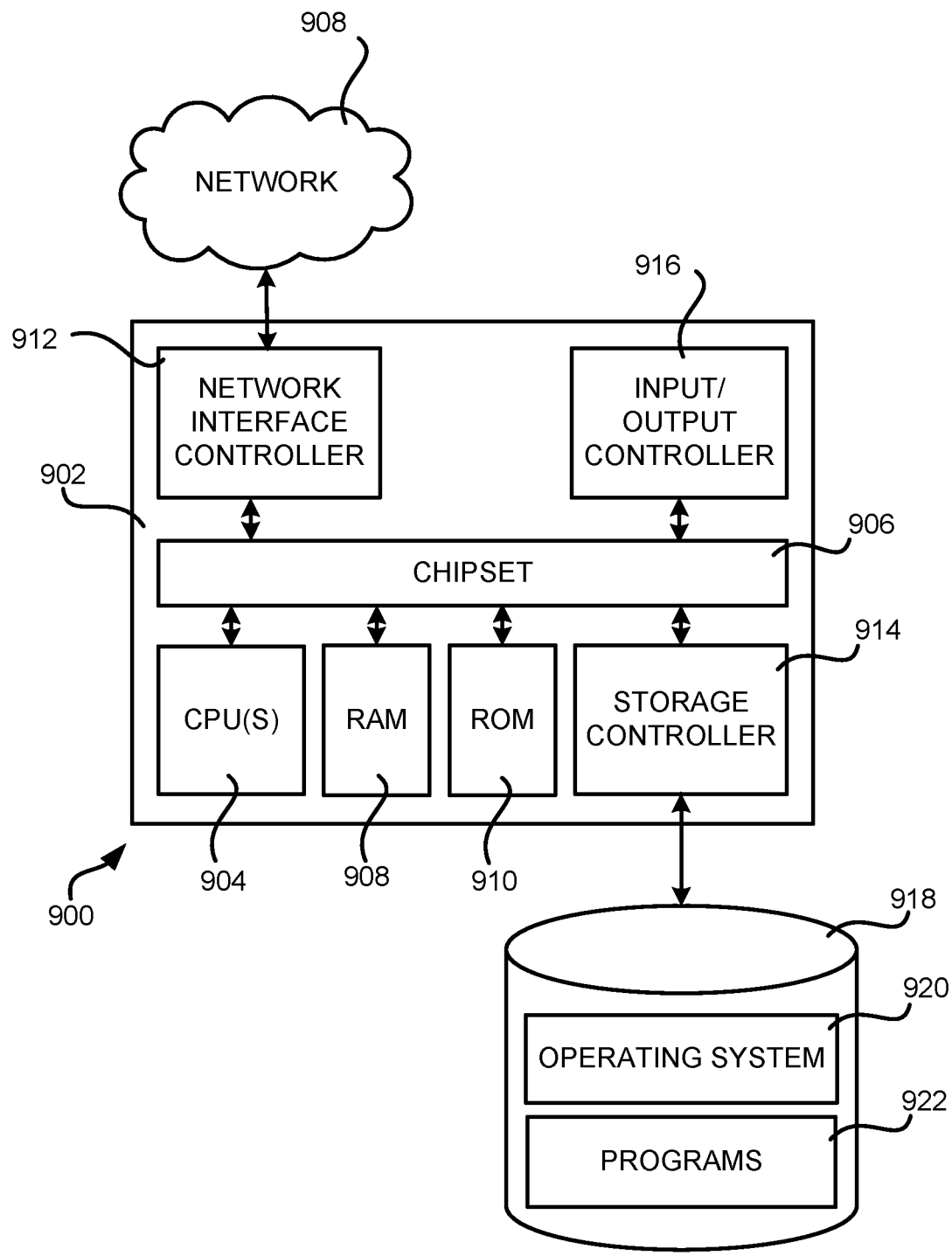
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 908. The chipset 906 can include functionality for providing network connectivity through a NIC 912, such as a gigabit Ethernet adapter. The NIC 912 is capable of connecting the computer 900 to other computing devices over the network 908. It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, programs 922, and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to one configuration, the operating system comprises the LINUX® operating system or one of its variants such as, but not limited to, UBUNTU®, DEBIAN®, and CENTOS®. According to another configuration, the operating system comprises the WINDOWS® SERVER operating system from MICROSOFT® Corporation. According to further configurations, the operating system can comprise the UNIX® operating system or one of its variants. It should be appreciated that other operating systems can also be utilized. The mass storage device 918 can store other system or application programs and data utilized by the computer 900.

In one configuration, the mass storage device 918 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to one configuration, the computer 900 has access to computer-readable storage media storing computer-executable instructions which, when executed by the computer 900, perform the various processes described above with regard to FIGS. 1-5. The computer 900 can also include computer-readable storage media for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or can utilize an architecture completely different than that shown in FIG. 9.

Based on the foregoing, it should be appreciated that technologies for providing a network service capable of identifying infrequently accessed data from a request stream have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:
one or more processors; and
at least one non-transitory computer-readable storage medium having instructions stored thereupon which, when executed by the one or more processors, cause the one or more processors to perform operations comprising:
obtaining first access requests corresponding to a first set of data objects stored in a data store of a network-based storage service, wherein the first access requests request access to the first set of data objects and the first set of data objects are stored in association with at least one first customer of the network-based storage service;
analyzing the first access requests and first metadata of the first access requests with one or more machine-learning algorithms trained to identify instances of fraud-related outcomes via utilizing previously determined instances of fraud, the one or more machine-learning algorithms trained to identify a first pattern of interactions with data objects with respect to the first access requests, wherein the first pattern of interactions with data objects includes first metrics for at least one type of data object access request;
determining, based on the trained one or more machine learning algorithms, one or more outcomes corresponding to the first pattern of interactions with the first set of data objects;
generating a model to identify outcomes corresponding to a number of data object interactions with at least a portion of the data objects stored by the network-based storage system, wherein the model includes the first pattern of interactions with the first set of data objects and the one or more outcomes;
obtaining second access requests corresponding to a second set of data objects stored in the data store, wherein the second access requests request access to the second set of data objects and the second set of data objects are stored in association with at least one second customer of the network-based storage service;

analyzing the second access requests with the one or more machine-learning algorithms trained to identify a second pattern of interactions with the second set of data objects with respect to the second access requests;

determining that the second pattern of interactions with the second set of data objects corresponds to the first pattern of interactions with the first set of data objects of the model;

identifying an outcome of the one or more outcomes included in the model based at least partly on the second pattern of interactions with the second set of data objects corresponding to the first pattern of interactions with the first set of data objects; and causing an electronic notification to be available to a computing device of the second customer, wherein the electronic notification includes the outcome.

2. The system of claim 1, wherein determining that the second pattern corresponds to the first pattern includes:

determining first additional metrics of the second access requests with respect to the at least one type of data object request and second additional metrics of the at least one type of metadata; and determining that a first similarity metric between the first metrics and the first additional metrics is greater than a threshold similarity metric and that a second similarity metric between the second metrics and the second additional metrics is greater than the threshold similarity metric.

3. The system of claim 1, wherein determining the one or more outcomes corresponding to the first pattern includes at least one of:

obtaining input from the first customer indicating that the first pattern corresponds to at least one outcome of the one or more outcomes; or identifying additional patterns of data object requests that previously produced the at least one outcome and a similarity metric between the pattern and each of the additional patterns is greater than a threshold similarity metric.

4. A computer-implemented method, comprising:

obtaining a data stream indicating interactions with data objects stored by a network-based storage service, wherein the interactions with the data objects are derived from requests to access the data objects and the data objects are associated with customers of the network-based storage service;

analyzing the interactions with the data objects via one or more machine-learning algorithms trained to identify instances of fraud-related outcomes via utilizing previously determined instances of fraud, the one or more machine-learning algorithms being trained to identify a pattern of data object interactions;

determining one or more outcomes corresponding to the pattern of data object interactions; and generating a model to identify outcomes corresponding to a number of data object interactions with at least a portion of the data objects stored by the network-based storage system, wherein the model includes the pattern of data object interactions and the one or more outcomes and the number of data object interactions are obtained subsequent to the interactions with the data objects.

5. The computer-implemented method of claim 4, further comprising performing an analysis of metadata of the interactions with the data objects, and wherein the model is generated at least in part based on the analysis of the metadata of the interactions with the data objects.

6. The computer-implemented method of claim 5, wherein the metadata includes at least one of a time of creation of the data objects, a size of the data objects, a modification history of the data objects, permissions related to the data objects, tags associated with the data objects, identifiers of the data objects, file type of the data objects, versioning information of the data objects, or encryption information of the data objects.

7. The computer-implemented method of claim 4, further comprising:

obtaining an additional data stream of additional interactions with additional data objects stored by the network-based storage service;

analyzing, with respect to the model, the additional interactions with the additional data objects;

determining that an additional pattern of the additional interactions corresponds to the pattern of the model; and determining that an outcome of the one or more outcomes corresponds to the additional interactions.

8. The computer-implemented method of claim 7, wherein:

the pattern indicates a first range of values for a first metric of the requests and a second range of values for a second metric of the requests;

determining that the additional pattern corresponds with the pattern of the model includes determining a similarity metric between the pattern and the additional pattern; and determining the similarity metric includes determining a value of the first metric for the second set of requests and a value of the second metric for the second set of requests and comparing the first value with the first range of values and comparing the second value with the second range of values.

9. The computer-implemented method of claim 4, further comprising:

identifying an additional pattern of data object interactions that produces at least one additional outcome of the one or more outcomes; and updating the model based at least partly on the additional pattern and the at least one additional outcome.

10. The computer-implemented method of claim 4, wherein the pattern indicates at least one of:

a first metric related to a first number of data object requests corresponding to a type of metadata of data object requests and corresponding to a first range of values for the first metric; or a second metric related to a second number of data object requests corresponding to a type of data object request obtained over a period of time and corresponding to a second range of values for the second metric.

11. The computer-implemented method of claim 4, wherein the outcome is exogenous with respect to the interactions with the data objects based at least partly on a probability of the outcome being previously attributed to data object interactions.

12. A computer-implemented method comprising:

obtaining a data stream indicating interactions with data objects stored by a network-based storage service, wherein the interactions with the data objects are derived from requests to access the data objects and the data objects are associated with customers of the network-based storage service;

analyzing the interactions with one or more machine-learning algorithms trained to identify instances of fraud-related outcomes via utilizing previously determined instances of fraud, the one or more machine-learning algorithms trained to determine a pattern of the interactions;

determining that the pattern corresponds to an additional pattern included in a model, wherein the model indicates one or more outcomes associated with the pattern;

identifying, utilizing the model, an outcome of the one or more outcomes based at least partly on the pattern of the interactions corresponding to the additional pattern included in the model; and providing a notification to a computing device, wherein the notification includes the outcome.

13. The computer-implemented method of claim 12, further comprising determining a group of the interactions, and wherein the pattern is determined from the group of interactions.

14. The computer-implemented method of claim 13, wherein the group of interactions is determined based at least partly on at least one of a characteristic of customers of the network-based storage service, a type of data object request, or a type of metadata related to requests for data objects.

15. The computer-implemented method of claim 12, wherein the outcome is associated with a confidence level; and the method further comprises providing the notification to a computing device of a customer of the network-based storage service based at least partly on the confidence level being above a threshold level.

16. The computer-implemented method of claim 12, wherein the outcome is associated with a confidence level, and the method further comprises providing an additional notification to an administrator of the network-based storage service based at least partly on the confidence level being below a threshold level.

17. The computer-implemented method of claim 12, wherein the outcome is associated with a confidence level, and the method further comprises:

providing a request to the customer for information regarding accuracy of the outcome based at least partly on the confidence level being below a threshold level; and obtaining input from a computing device of the customer indicating an amount of accuracy of the outcome.

18. The computer-implemented method of claim 12, wherein the outcome is associated with a confidence level and the confidence level is based at least partly on at least one of a number of previous outcomes used to determine the model, a machine-learning algorithm utilized to generate the model, or a similarity metric between the pattern of the interactions and the additional pattern included in the model.

* * * * *